July 10, 1945.  C. L. PATTERSON  2,380,067
WIRE-ROLLING MILL
Filed April 26, 1944  2 Sheets-Sheet 1

INVENTOR.
CHESTER LEROY PATTERSON
BY *Walter S. Bleston*
ATTORNEY

July 10, 1945.　　　C. L. PATTERSON　　　2,380,067
WIRE-ROLLING MILL
Filed April 26, 1944　　　2 Sheets-Sheet 2

INVENTOR.
CHESTER LEROY PATTERSON
BY
ATTORNEY

Patented July 10, 1945

2,380,067

UNITED STATES PATENT OFFICE 2,380,067

WIRE-ROLLING MILL

Chester Leroy Patterson, Jackson Heights, N. Y., assignor to Aircraft Screw Products Company, Inc., Long Island City, N. Y., a corporation of New York Application April 26, 1944, Serial No. 532,695

5 Claims. (Cl. 80—31.1)

The invention relates to a machine for shaping the cross-section of a wire with the aid of a pair of rollers rotatable about parallel axes and tangent to each other, which are so peripherally grooved that the cross-sections of the grooves complement each other to the desired cross-section of the wire. In machines of this type it has been found extremely difficult to fix the two rollers in the exact positions relatively to each other if a high grade of accuracy of the wire cross-section is required. The invention contemplates to overcome such difficulties by a device wherein only one of the shaping rollers may be secured in a predetermined position fixed in the direction of its axis whereas the position of the other roller is adjustable in axial direction relatively to the first one. The invention consists in the provision of a pair of guide rollers rotatable about axes at right angles to those of the shaping rollers and bearing against the side walls of the second shaping roller wherein the guide rollers are adjustable in a direction parallel to the axes of the shaping rollers to shift the second shaping roller relatively to the fixed roller and to hold it in an adjusted position.

Further objects and details of the invention will be apparent from the description given hereinafter and the accompanying drawings illustrating two embodiments thereof by way of example.

Figure 1:
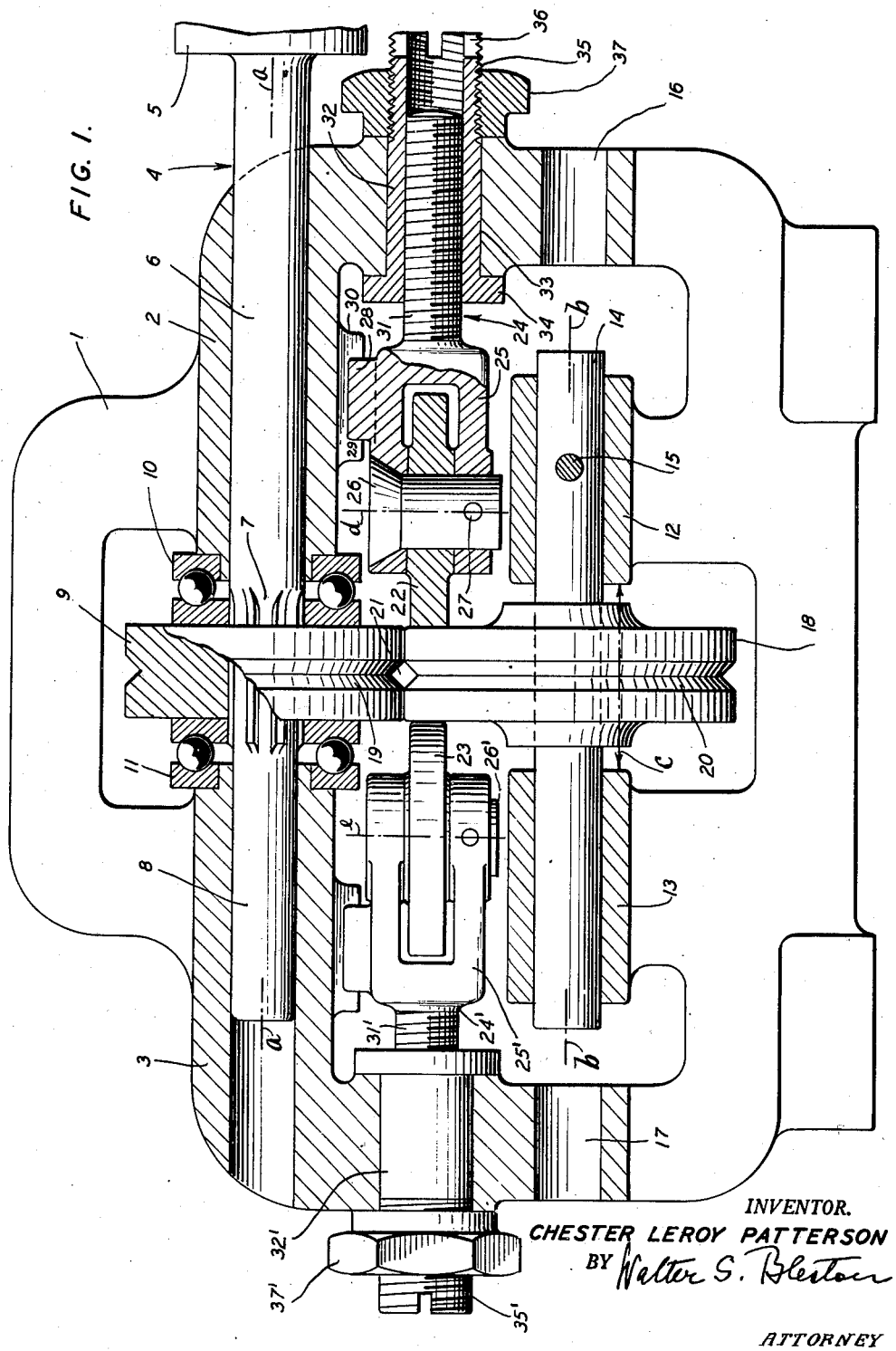
Fig. 1 is a cross-section of a device according to the invention.

Referring now to the drawings (Fig. 1), a stationary frame 1 is provided with two axially aligned bearings 2 and 3 for a shaft 4 which may be driven from a power source not shown connected to the flange 5. The shaft 4 comprises three major portions 6, 7 and 8 of which the portions 6 and 8 are supported by the bearings 2 and 3 respectively. The diameter of the portion 8 is smaller than that of the portion 6 and the middle part 7 is splined so that the outer circumference of the splines is not larger than the diameter of the portion 6 and the diameter of the bottoms of the spline grooves is not smaller than the diameter of the shaft portion 8. Consequently, shaft 4 can be assembled by shifting it from the right-hand side into the position shown in Fig. 1. A shaping roller 9 is splined to the portion 7 and anti-friction thrust bearings 10 and 11 are arranged between the roller 9 and the bearings 2 and 3 so that roller 9 is very accurately fixed in axial direction but free to rotate with shaft 4. A second pair of bearings 12 and 13 are arranged with their axes b—b in line and parallel to the axis a—a of shaft 4. Another shaft 14 is supported by the bearings 12 and 13 and secured against axial shifting and rotation by means such as pin 15 penetrating bearing 12 and the shaft 14. In order to bring the shaft 14 into position, the frame 1 is provided with at least one opening 16, and if so desired for sake of symmetry, with an opposite opening 17 co-axial with the bearings 12 and 13. The two bearings 12 and 13 are spaced from each other and between them a second shaping roller 18 is mounted so as to be tangent with respect to roller 9. Roller 18 is freely rotatable on the shaft 14 and can also be shifted in axial direction as far as its width and the spacing c of the bearings 12 and 13 will permit. It is in the present embodiment assumed that the rollers are destined to form a diamond-shaped wire and consequently, the rollers are provided with peripheral grooves 19 and 20 respectively of triangular shape which complement each other to the diamond cross-section 21 at the point of tangency of the rollers. Now in order to render the portion of roller 18 adjustable with respect to roller 9, a set of guide rollers 22 and 23 is provided which bear on opposite sides against the side walls of the roller 18. Rollers 22 and 23 are rotatable about axes d and e respectively in the plane defined by the axes a and b, but at right angles thereto. They contact roller 18 very close to its periphery and near the line of tangency of the shaping roller in order to render ineffective any inaccuracy which otherwise might occur. Rollers 22 and 23 are adjustable in a direction parallel to the axes a and b of the shaping rollers. For that purpose a member 24 with a forked head 25 is provided for roller 22, in which a pivot pin 26 is secured by means of a cotter pin such as indicated at 27, and the roller 22 is mounted on the pivot pin 26 so as to rotate freely thereon between the arms of the fork. The fork 25 has an upper projection 28 engaging groove 29 of a lower projection 30 of bearing 2, so that member 24 is prevented from turning but can be shifted in relation to bearing 2 and other stationary parts of the frame. The other end of the member 24 is constituted by an externally threaded shank 31 which engages an interiorly threaded nut member 32 rotatable in a bore 33 of the frame 1. The nut bears with a flange 34 against the inner frame wall and projects with an externally threaded portion 35 outwardly in relation to the frame. The extreme outer end of the nut is recessed at 36 and a stop nut 37 is screwed on the external threading 35. Consequently, if the stop nut is loosened, nut 32 can be turned so as to shift member 24 backward or forward into a desired position which then may be fixed by tightening the stop nut 37. The means to adjust roller 23 are of the same nature as those described with respect to roller 22. They are shown in Fig. 1 in side elevation rather than in cross-section and comprise parts as enumerated hereinbefore, viz., the member 24' with fork head 25' and threaded shank 31' which engages the nut 32' with stop nut 37' on the external threading 35' of the nut 32'. Roller 23 is rotatable on the pivot pin 26' secured in the fork 25'. Now it will be clear that in the structure described the driven roller 9 is in an accurately fixed position owing to the arrangement of the ball bearings 10 and 11, whereas roller 18 is shiftable in axial direction and can be adjusted and held in adjusted position by the rollers 22 and 23 which in turn are adjustable by turning nut members 32 and 32'. It will be clear that in this manner a very great accuracy in the shaping of the cross-section 21 can be obtained.

Figure 2:
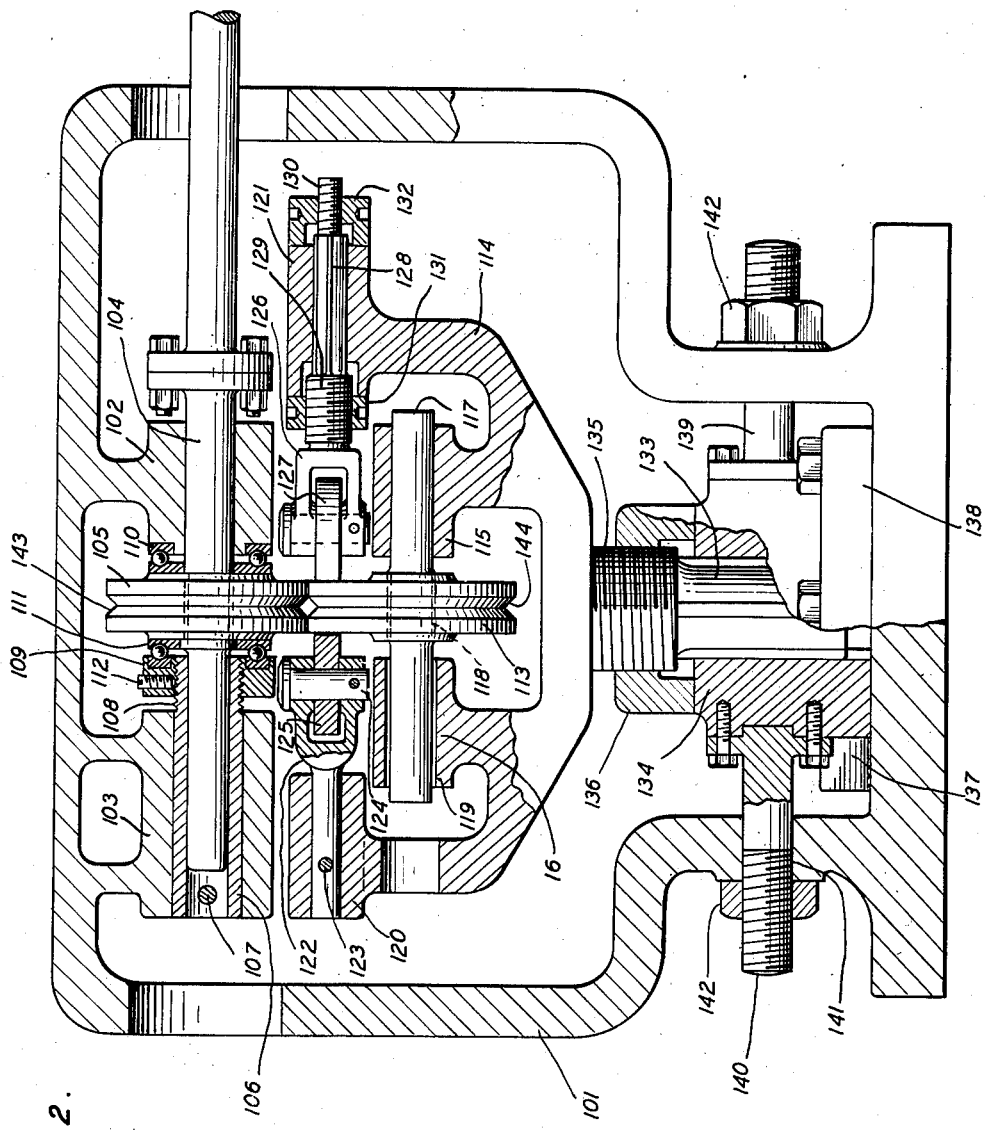
Fig. 2 is a cross-section of another embodiment.

Now I have found that in certain cases it is advisable to provide for the possibility of additional adjustment. This relates in particular to the possibility of a certain adjustment of the first shaping roller in an axial direction, and/or of the second shaping roller in a direction at right angles to its axis. An embodiment showing means for such adjustments has been shown in Fig. 2. Similarly to the first embodiment, a frame 101 comprises the bearings 102 and 103 for shaft 104 for the first shaping roller 105. One of the bearings 103 is provided with a bushing 106 secured thereto by means such as pin 107. The end of bushing 106 which is directed to the roller 105 is externally threaded at 108 and a nut 109 is screwed on the threading 108. One thrust bearing 110 is arranged between roller 105 and bearing 102, whereas the other thrust bearing 111 is positioned between the roller and nut 109. This arrangement is made in order to avoid any undesirable clearance which otherwise might occur between the roller and its thrust bearing. Such clearance even if minute would interfere with the accuracy of the desired wire cross-section. In the present embodiment, however, by adjusting nut 109 and then securing it by means of set screw 112, it can be obtained that a certain axial pressure is exerted from both sides against the roller 105 so that the latter will be held in a truly fixed position.

Contrary to the structure of Fig. 1, the second shaping roller 113 is carried by a separate frame 114. This frame comprises the bearings 115 and 116 for shaft 117 to which the roller 113 is splined at 118. In order to make assembling possible, bearing 116 is provided with grooves 119 corresponding to the splines 118; however, it is to be understood that the shaft 117 is freely rotatable in bearing 116 as well as in 115 and that the shaft with the roller 113 thereon can move to a limited extent in axial direction. Frame 114 comprises two additional bearings 120 and 121 arranged parallel to and between the bearings for the shafts 104 and 117. A forked member 122 is inserted in bearing 120 and secured thereto by means such as pin 123 against relative movement in any direction. This member 122 carries the pin 124 on which the first guide roller 125 is rotatable so as to bear against one side of the second roller 113. The corresponding forked member 126 which in a similar arrangement carries the second guide roller 127 is axially shiftable in bearing 121 but prevented from rotation by splines 128. The shank of member 126 has two threadings 129 and 130 with nuts 131 and 132 respectively thereon so as to provide for adjustability of the roller 127. It will be noticed that in this arrangement adjustability of the guide roller 127 will accomplish mainly a regulation of the pressure exerted sideways by rollers 125 and 127 on roller 113 but will not provide for a shift of roller 113 in relation to roller 105. Other means are provided for this purpose and in connection therewith also means for adjusting the axial spacing between the shafts 104 and 117. For this purpose, frame 114 has a shank-like extension at right angles to shaft 117. The end 133 of that extension is splined to a block member 134; the portion between the end 133 and the frame 114 is externally threaded at 135, and a nut 136 is screwed on that threading and bears on the top face of the block 134. The latter is guided by rails 137 and 138 which may be of triangular shape so that the block is free to be shifted in a direction parallel to the shaft 104. As the frame extension 133 is prevented from turning relative to the block parallellism between shaft 104, shaft 117 and direction of movement of block 134 is insured. In order to adjust the position of block 134 and thus also of roller 113 relatively to the fixed roller 105, the block 134 is provided with two externally threaded bolt-like extensions 139 and 140 which pass through holes 141 in the frame 101. Nuts 142 are screwed on the threadings of the bolt extensions 139 and 140 and bear against the frame 101. Now it will be clear that by loosening and tightening of nuts 142 a shifting of block 134 can be obtained and the adjusted position secured in order to accomplish perfect registry of the grooves 143 and 144 of the rollers 105 and 113 respectively. It will be understood that the particular cross-section of the roller grooves are shown merely as an example and that the device according to my invention may be applied to cross-sections of any wire form by accordingly selecting the groove cross-section. Furthermore, in the illustrated embodiments the shafts of the fixed shaping rollers have been shown as being power-driven by an external force. However, it will be clear that no such force is required, if the wire to be shaped is pulled through the opening formed by the grooves of the two shaping rollers and that in such an event rotation of both rollers will occur owing to their friction with the wire.

Having now described two embodiments of my invention, it will be apparent to those skilled in the art that many alterations and modifications thereof may be made without departing from the spirit and essence of my invention, which shall be limited only by the scope of the appended claims.

I claim:

1. A device for rolling wire comprising a pair of peripherally grooved rollers rotatable about parallel axes and tangent to each other, the cross-sections of the roller grooves complementing each other to the desired wire cross-section, a frame including bearings for said first roller and means to secure said first roller in a fixed position in axial direction, bearings for said second roller with freedom of the latter to shift in axial direction, a second pair of rollers rotatable about axes in the plane of but at right angles to the axes of the first pair of rollers, said rollers of the second pair being adjustable as to their spacing from each other and adapted to bear against the side walls of the last mentioned roller, supports for the rollers of said second pair, a structure rigidly connecting said bearings of said second roller of the first pair and said supports to each other, and being mounted on said frame, and means in engagement with said frame and said structure to adjust the position of the latter in the frame in a direction parallel to the axes of the rollers of the first pair.

2. A device as claimed in claim 1, said structure including means for varying the extension of said structure in a direction parallel to the axes of the roller of said second pair to adjust the spacing of the axes of the rollers of said first pair.

3. In a device for rolling wire including a first pair of peripherally grooved rollers rotatable about parallel axes and peripherally tangent to each other, wherein one of said rollers is adjustable in the direction of its axis in order to cause the roller grooves to register, the combination of a second pair of rollers rotatable about axes in the plane of but at right angles to the axes of the first pair of rollers, the rollers of said second pair being adapted to bear against the side walls of the adjustable roller of the first pair, means to support said second pair of rollers so as to contact said adjustable roller of said first pair close to where the rollers of the first pair contact each other, and means to adjust the position of each roller of the second pair independently of the position of the other roller of the second pair in a direction parallel to the axes of said first pair of rollers.

4. In a device for rolling wire including a first pair of peripherally grooved rollers rotatable about parallel axes and peripherally tangent to each other, wherein the first one of said rollers is adjustable in the direction of its axis in order to cause the roller grooves to register, the combination of adjustable thrust bearings for said second roller to insure its immovability in the direction of its axis, a second pair of rollers rotatable about axes in the plane of but at right angles to the axes of the first pair of rollers, the rollers of said second pair being adapted to bear against the side walls of the first roller of the first pair, supports for the rollers of said second pair, so arranged as to guide the last mentioned rollers to contact the first roller of the first pair close to where the rollers of the first pair contact each other, and means to adjust the position of each support independently of the position of the other in a direction parallel to the axes of said first pair of rollers.

5. In a device for rolling wire including a first pair of peripherally grooved rollers rotatable about parallel axes and peripherally tangent to each other, wherein one of said rollers is adjustable in the direction of its axis in order to cause the roller grooves to register, the combination of bearings for said adjustable roller, with freedom of the latter to shift in axial direction, a second pair of rollers rotatable about axes in the plane of but at right angles to the axes of the first pair of rollers, the rollers of said second pair being adapted to bear against the side walls of the adjustable roller of the first pair close to where the rollers of the first pair contact each other, means to adjust the position of the rollers of the second pair relatively to each other and in a direction parallel to the axes of the rollers of the first pair, a structure connecting said means and said bearings, and means to adjust the position of said structure relatively to the other roller of said first pair in a direction parallel to the axes of rotation of the rollers of said first pair.

CHESTER LEROY PATTERSON.